United States Patent [19]

Komatsu et al.

[11] Patent Number: 5,123,090

[45] Date of Patent: Jun. 16, 1992

[54] DATA PROCESSING APPARATUS FOR PROCESSING ASYNCHRONOUS DATA IN AN ASYNCHRONOUS TYPE DATA FLOW COMPUTER

[75] Inventors: Koji Komatsu; Daisuke Azuma, both of Nara, Japan

[73] Assignee: Sharp Kabushiki Kaisha, Osaka, Japan

[21] Appl. No.: 298,954

[22] Filed: Jan. 19, 1989

[30] Foreign Application Priority Data

Jan. 22, 1988 [JP] Japan .................. 63-13277

[51] Int. Cl.⁵ ........................................... G06F 13/00
[52] U.S. Cl. ..................................... 395/200; 364/229; 364/229.1; 364/230; 364/238.6; 364/239; 364/DIG. 1
[58] Field of Search ... 364/200 MS File, 900 MS File

[56] References Cited

U.S. PATENT DOCUMENTS 4,549,047 10/1985 Brian et al. .................... 179/18 B
4,564,901 1/1986 Tomlinson et al. ............... 364/200
4,876,644 10/1989 Nuechterlein et al. ............ 364/200

Primary Examiner—Thomas C. Lee
Assistant Examiner—Robert B. Harrell

[57] ABSTRACT

Data is transferred on respective data transfer paths in an asynchronous manner. Data detecting sections are provided at predetermined positions along the respective data transfer paths. A data detecting devices to detect presence of the data in the respective data detecting sections. A coexistence detecting device is used responsive to the data detecting device to detect simultaneous existence of data in the data detecting sections of a predetermined combination. Data being held in a data holding device is referred to in the corresponding data detecting sections in response to the result of detection by the coexistence detecting device, whereby a plurality of pieces of data are simultaneously referred to among the data being transferred along the data transfer paths in an asynchronous manner.

5 Claims, 5 Drawing Sheets 5,123,090

DATA PROCESSING APPARATUS FOR PROCESSING ASYNCHRONOUS DATA IN AN ASYNCHRONOUS TYPE DATA FLOW COMPUTER

BACKGROUND OF THE INVENTION

1. Field of the Invention

The present invention relates to a data processing apparatus and, more specifically, relates to a data processing apparatus for processing asynchronous data such as in an asynchronous type data flow computer or the like.

2. Description of the Background Art

With a conventional synchronous type data processing system, the timing of data being entered necessary for processing can be predicted within its timing margin, which makes it easy to set the timing for referring to its data.

On the other hand, with a system for processing data entered in an asynchronous manner, the timing of data being entered cannot be predicted, which makes it necessary to hold the data in a latch or the like at a specified position in a waiting state, in order to refer to necessary data. Furthermore, with an asynchronous data processing system such as a data flow type computer, it is necessary to detect a pair of data meeting a given condition among the data transferred within the system in an asynchronous and parallel manner and, to that end, conventionally a system was employed for transmitting data in the directions opposite to each other on the respective data transmission paths and for comparing all the data being transferred.

Such an asynchronous type data processing system keeps its data in a waiting state involves a problem in that the processing of data is stopped during the waiting period and hence the overall processing performance of the system is decreased. On the other hand, in case of a system for comparing all the data being opposite to each other, it could happen that transmission of data is disturbed where a plurality of data are to be referred to simultaneously, resulting in the problem of decreasing the processing performance of the whole system.

SUMMARY OF THE INVENTION

The present invention is designed to eliminate the above described problem and as an object to provide a data processing apparatus capable of simultaneously referring to a plurality of pieces of data among asynchronous data flowing along a data transmission path without degrading the processing performance of the system.

Briefly described, the present invention is adapted such that a data detecting section is provided in a predetermined portion of a data transmission path in which a data detecting device detects the presence of the data in the above described data detection section. The present invention is further adapted such that a coexistence detecting device detects the simultaneous existence of the data in the data detection section of any predetermined combination. Data held in the data holding device in a corresponding data detecting section is referred to based on the detection result of the coexistence detecting means, so that a plurality of pieces of data can be referred to simultaneously among the data transferred in an asynchronous manner on the data transmission path.

According to the present invention, a small scale circuit can easily detect a set of data entered in a timing condition necessary for data processing among asynchronous data, thereby making operation of the system more efficient.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
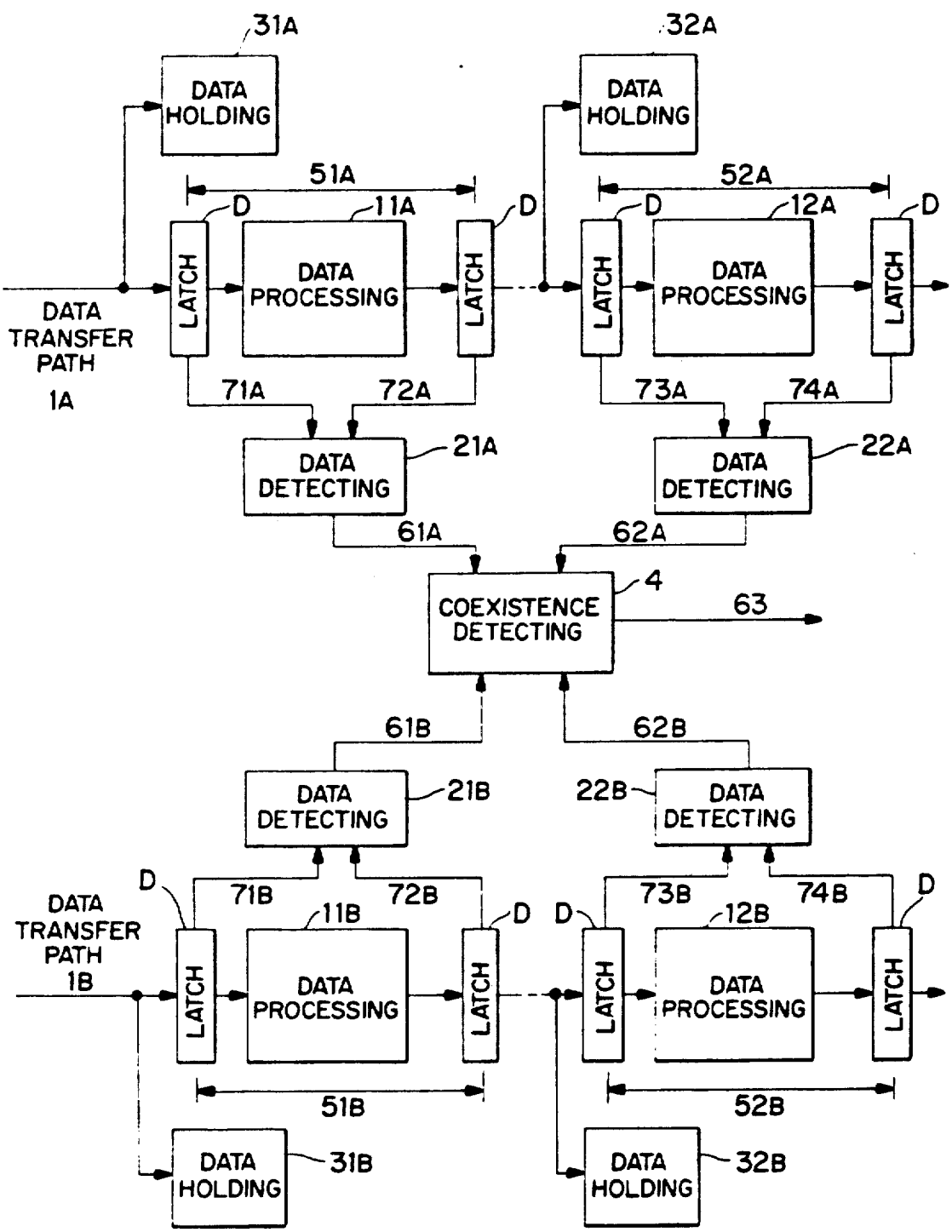
FIG. 1 is a block diagram showing a structure of one embodiment of the present invention.

FIG. 1 is a block diagram showing a structure of one embodiment of the present invention with two data detecting sections on each of two parallel data transfer paths. As shown, the embodiment includes data transfer paths 1A and 1B; data processing device 11A, 12A, 11B and 12B; data detecting device 21A, 22A, 21B and 22B; data holding device 31A, 32A, 31B and 32B; and coexistence detecting device 4.

Figure 2:
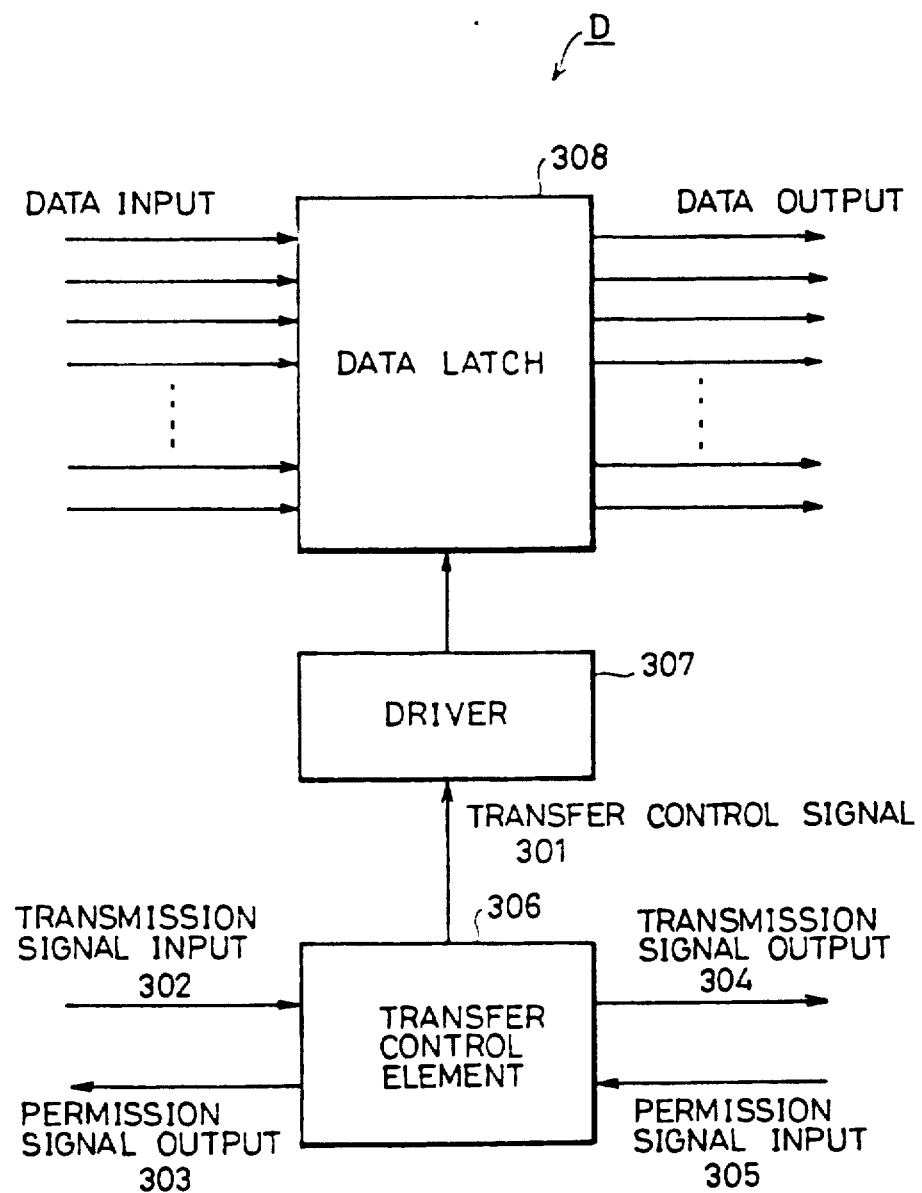
FIG. 2 is a view showing one example of a structure of latch D shown in FIG. 1.

Each of the respective transfer paths 1A and 1B disposed in parallel with each other comprises a plurality of stages of latches D connected in series. As shown in FIG. 2 each latch D including a transfer control element 306, a driver 307, and a data latch 308. The transfer control elements 306 cooperate with with other latches D disposed forward and backward each element to transmit and receive transmission signals 302 and 304 and permission signals 303 and 305, creating a so-called handshake control. More specifically, the state of the transfer control element 306 of the latch D connected in the succeeding stage is detected in response to the permission signal 305, thereby to generate a transfer control signal 301 and a transmission signal 304 in response to the result of the detection thereof. The driver 307 actuates the data latch 308 in response to the transfer control signal 301. The data latch 308 includes at least one latch circuit, so that holding and passage of data are controlled in response to the above described transfer control signal 301. Alternatively, the respective latches D may be controlled by an externally supplied clock signal in place of the above described handshake control.

The data processing device 11A, 12A, 11B and 12B are respectively disposed between the two consecutive latches D and make a processing operation such as an arithmetic operation on the data from the latch D of the preceding stage to transfer the results to the latch D of the succeeding stage. Furthermore, the above described respective data processing means 11A, 12A, 11B and 12B may be adapted to divide the contents of a processing operation to be performed so that the respective processing operations of these may be done in a pipeline processing manner between the above described plurality of stages of the latch means.

The data detecting sections 51A, 52A, 51B and 52B are provided at arbitrary positions on the above described respective data transfer paths 1A and 1B. For example, referring to the data detecting section 51A, arrival signals 71A and 72A representing arrival of the respective data from the two latches D disposed preceding and succeeding the data processing means 11A are provided. The data detecting device 21A provides a detection signal 61A representing the period of existence of data in the data detecting section 51A (the period after the data is held in the latch D of the preceding stage until the said data is transferred and held in the latch means D of the succeeding stage) in response to arrival signals 71A and 72A. The same also applies to the other data detecting sections. More specifically, as for the data detecting section 52A, the data detecting means 22A provides the detection signal 62A in response to the arrival signals 73A and 74A from the two latches D disposed preceding and succeeding the data processing device 12A. As for the data detecting section 51B, the data detecting device 21B provides the detection signal 61B in response to the arrival signals 71B and 72B from the two latches D disposed preceding and succeeding the data processing means 11. As for the data detecting section 52B the data detecting means 22B provides the detection signal 62B in response to the arrival signals 73B and 74B from the two latches D disposed preceding and succeeding the data processing means 12B. Meanwhile, the transmission signal output 304 of FIG. 2, for example, may be used as the arrival signals 71A, 72A, 73A, 74A, 71B, 72B, 73B and 74B obtained from the respective latches D. The detection signals 61A, 61B, 62A and 62B obtained from the respective data detecting 21A, 21B, 22A and 22B are supplied to the coexistence detecting device 4. The data holding device 31A, 31B, 32A and 32B including the latch circuits or the like are provided corresponding to the data detecting sections 51A, 51B, 52A and 52B, respectively, so that a portion or all of the data is stored and held where the data is present in the respective data detecting sections.

In the above described structure, the coexistence detecting device 4 detects the simultaneous presence of the data in the data detecting sections of a predetermined set, thereby to provide a detection signal 63 representing the same. Accordingly, by referring to the contents held in the data storing device corresponding to the data detecting section where the data coexists in response to the detecting signal 63, a plurality of pieces of data can be simultaneously referred to. In case of a data flow type computer, for example, by comparing the logics between the two pieces of data being referred to, it is determined whether the data satisfies a predetermined condition and, when the condition is met, the data pair is produced from the two pieces of data.

Figure 3:
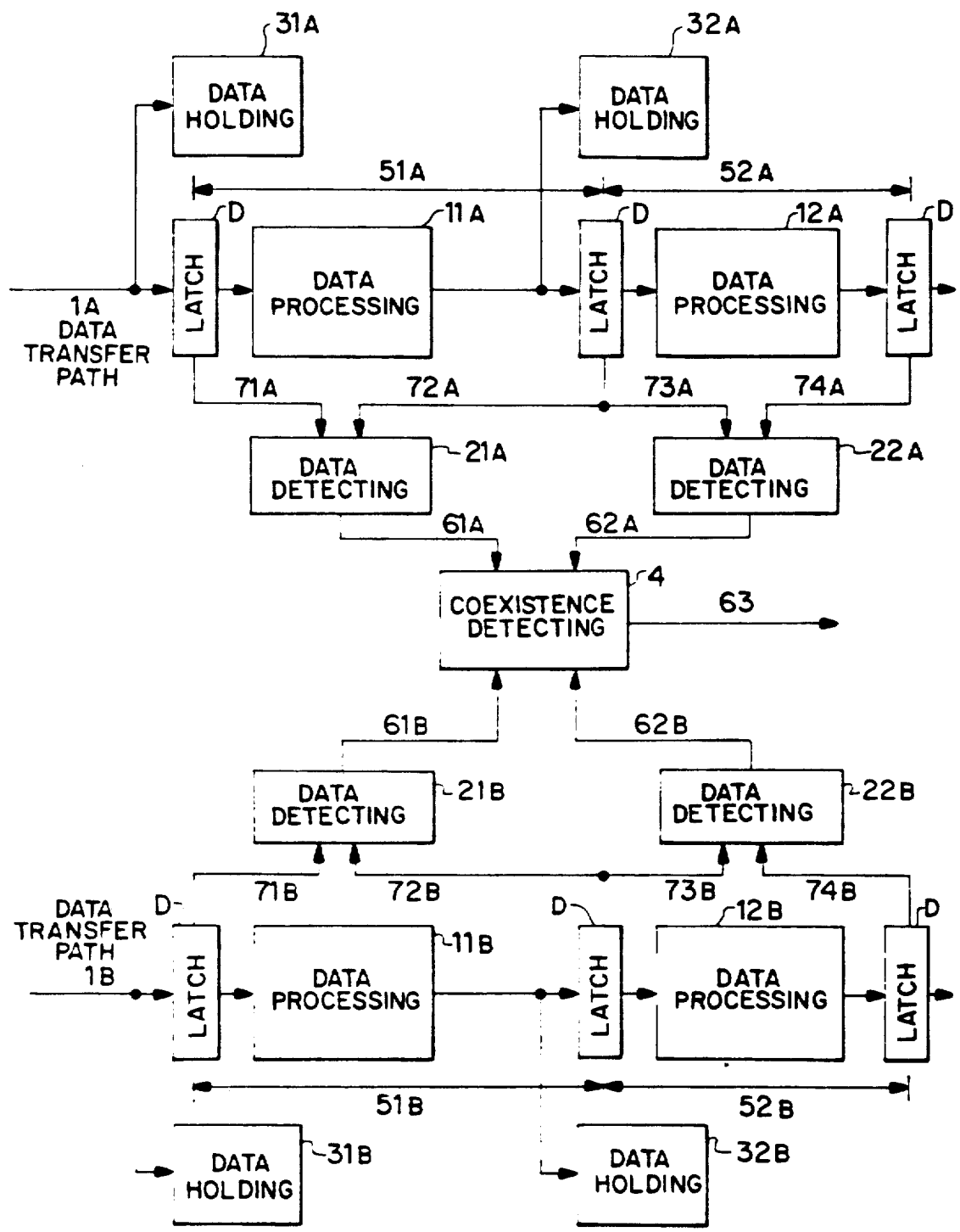
FIG. 3 is a block diagram showing a structure of another embodiment of the present invention.

FIG. 3 is a block diagram showing a structure of another preferred embodiment of the present invention where two data detecting sections exist on each of the two parallel data transfer paths, similar to the embodiment of FIG. 1. The embodiment shown in FIG. 3 is structured particularly well for an advanced detecting portion of a memory for waiting in a data flow type data processing apparatus and a different point of the FIG. 3 embodiment from the FIG. 1 embodiment resides in the series provision of the data detecting sections 51A and 52A and 51B and 52B, respectively.

Figure 4:
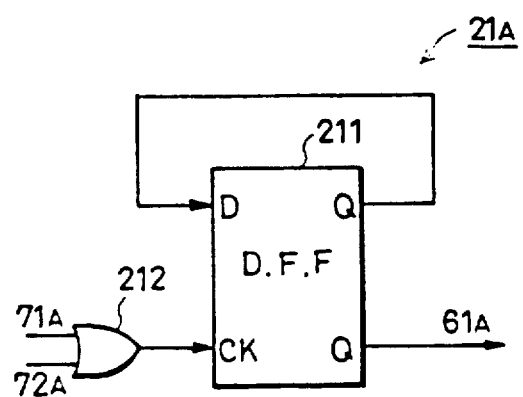
FIG. 4 is a view showing one example of a structure of data detecting device 21A as shown in FIG. 3.

FIG. 4 is a schematic diagram showing one example of a structure of the data detecting device 21A shown in FIG. 3. Although FIG. 4 shows only data detecting device 21A, the other data detecting device 22A, 21B and 22B may be structured in the same manner. As shown there, the data detecting device 21A includes a D type flip-flop 211 and an OR gate 212. A clock terminal CK of the D type flip-flop 211 is supplied with the arrival signals 71A and 72A through the OR gate 212. The $\overline{Q}$ output from the D type flip-flop 211 is fed back to the data input terminal D of the D type flip-flop 211. The Q output of the D type flip-flop 211 becomes the detecting signal 61A.

Figure 5:
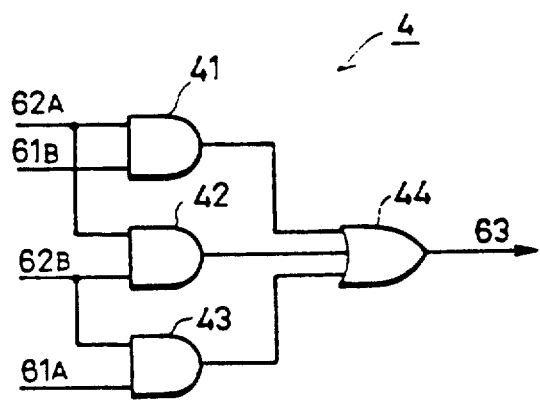
FIG. 5 is a view showing one preferred embodiment of a structure of coexistence detecting device 4 shown in FIG. 3.

FIG. 5 is a schematic diagram showing one example of a structure of the coexistence detecting device 4 includes shown in FIG. 3. As shown, the coexistence detecting means 4 three AND gates 41, 42, and 43 and one OR gate 44. The AND gate 41 is supplied with detecting signals 62A and 61B, and the AND gate 42 is supplied with the detecting signals 62A and 62B, and the AND gate 43 is supplied with the detecting signals 62B and 61A. The outputs from these three AND gates 41, 42 and 43 are supplied to the OR gate 44. The output from the OR gate 44 becomes the detecting signal 63.

Figure 6:
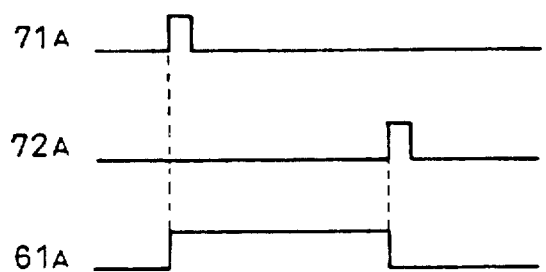
FIG. 6 is a time chart for illustrating operation of the data detecting device 21A as shown in FIG. 4.
Figure 7:
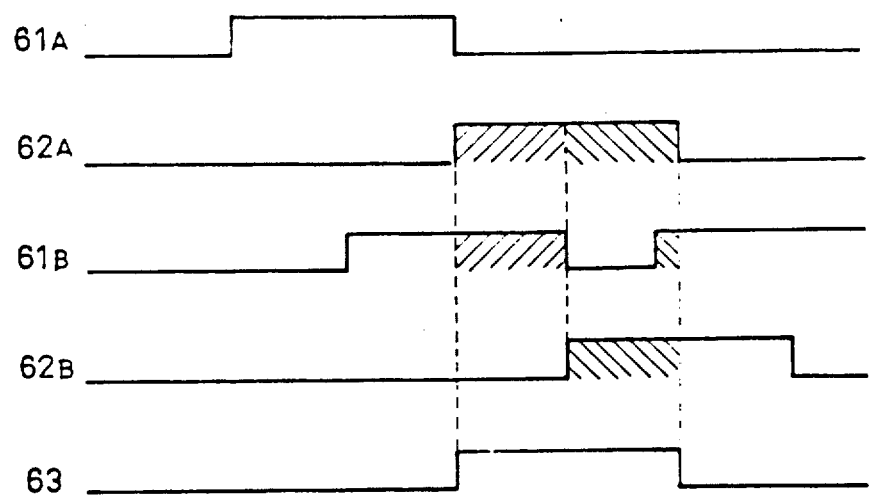
FIG. 7 is a time chart for explaining operation of the coexistence detecting device 4 shown in FIG. 5.

FIG. 6 is a time chart for explaining an operation of the data detecting device 21A shown in FIG. 4. FIG. 7 is a time chart for explaining an operation of the coexistence detecting device 4 shown in FIG. 5. The following describes an operation of the embodiment shown in FIGS. 3 to 5 with reference to FIGS. 6 and 7.

First referring to FIG. 6, operation of the data detecting device 21A will be described. Other data detecting means 22A, 21B and 22B also operate in a similar manner to the detecting means 21A the following. At the outset, the latch D disposed preceding the stage of the data processing means 11A latches data and in synchronism therewith the arrival signal 71A obtained from the said preceeding means D rises to the high level. Therefore, the input signal of the clock terminal CK of the D type flip-flop 211 rises through the OR gate 212 to the high level. In response thereto, the D type flip-flop 211 receives the input signal applied to the data input signal D to store the same. Assuming that the D type flip-flop 211 has the Q output in the state of the low level and the $\overline{Q}$ output in the state of the high level, then the D type flip-flop 211 enters the data input of the high level to store the same. As a result, the Q output 61A of the D type flip-flop 211 becomes the high level, while the $\overline{Q}$ output of the D flip-flop 211 becomes the low level. Then the latch D disposed succeeding the data processing device 11A latches the data, when the arrival signal 72A obtained from the said succeeding latch D rises to the high level. Therefore, the D type flip-flop 211 enters the low level signal being inputted to the data input terminal D at that time to store the same therein. As a result, the D type flip-flop 211 inverts the state, so that the Q output 61A turns to the low level while the $\overline{Q}$ output turns to the high level. Accordingly, the Q output 61A of the D type flip-flop 211, i.e. the detection signal 61A of the data detecting device 21A becomes a signal which assumes the high level only during a period when the data exists in the data detecting section 51A.

Now operation of the coexistence detecting device 4 will be described with reference to FIG. 7. As it is apparent from a circuit configuration shown in FIG. 5, the detection signal 63 from the coexistence detecting device 4 turns to the high level, if and when both of the detection signals 62A and 61B are the high level, both of the detection signals 62A and 62B are the high level, and both of the detection signals 62B and 61A are the high level. Referring to the time chart shown in FIG. 7, the detection signal 63 assumes the high level during the overlapped period of the high levels of the detection signals 62A and 61B and during the overlapped period of the high levels of the detection signals 62A and 62B. More specifically, the coexistence detecting device 4 serves to detect the period where the data exists simultaneously in the data detecting sections 52A and 51B, the period where the data exists simultaneously on the data detecting sections 52A and 52B, and the period where the data exists simultaneously on the data detecting sections 52B and 51A. Even if and when the propagation time of the data per one stage between the respective latch means D constituting the data transfer paths 1A and 1B (for example, a time period from a change of the arrival signal 71A to a change of the next arrival signal 72A) is uniform and a time period when the data exists in the respective data detecting sections 51A, 52A, 51B and 52B is equal to the above described propagation time, the coexistence detecting device 4 can detects the data pair of a deviation of the arrival time of travelling through data the data detecting sections 51A and 51B being smaller than the above described propagation time period of two stages.

Meanwhile, the above described respective embodiments were described in conjunction with a case where a desired set of data is referred to from the two parallel data transfer paths 1A and 1B; Alternatively one data transfer path or three or more data transfer paths may be used. In the case where data is to be referred to from one data transfer path, the set of data being sent shortly before or after the same is to be detected.

Furthermore, the number of pieces of data to be detected simultaneously is not limited to two data. The system may be adapted such that three or more pieces of data are simultaneously detected.

Although the above described respective embodiments were defined such that a region between two latches means successively disposed is used as a data detecting section, naturally it may be structured such that a further latch means is interposed between these two latch.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus for simultaneously referring to a plurality of data being transferred in an asynchronous manner along a data transfer path, the apparatus comprising:
   a data transfer path along which are positioned a plurality of latch means, connected in series, for producing a signals indicative of the presence of data at each of said latch means and through which said data passes, said latch means defining a plurality of data detecting sections between respective pairs of latch means,
   data processing means disposed along said data transfer path and between any two of said latch means,
   for performing a predetermined processing operation on the data being transferred along said data transfer path and through a data detecting section,
   a plurality of data detecting means responsive to signals from said latch means for detecting the presence of the data in said data detecting sections and producing a detection signal indicating the presence of data.
   data holding means disposed along said data transfer path at each of said plurality of data detecting sections for temporarily storing and holding a portion or all of the data existing in said data detecting sections, and
   coexistence detecting means responsive to the detection signals from said data detecting means for detecting coexistence of said data in a predetermined combination of data detecting sections, whereby upon detection of data in a predetermined combination of data detecting sections, the coexistence detecting means causes the apparatus to access data held in said data holding means in a predetermined data detecting section.

2. A data processing apparatus in accordance with claim 1, wherein
   said data detecting sections are provided at separate portions on said data transfer path.

3. A data processing apparatus in accordance with claim 1, wherein
   said data detecting sections are provided in succession on said data transfer path.

4. A data processing apparatus for simultaneously referring to a plurality of data being transferred in an asynchronous manner along a data transfer path, the apparatus comprising:
   a data transfer path along which are positioned a plurality of latch means, connected in parallel, for individually producing signals indicative of the presence of data at respective latch means through which said data passes, said latch means defining a plurality of data detecting sections,
   data processing means disposed along said data transfer path for performing a predetermined processing operation on the data being transferred along said data transfer path and through a data detecting section,
   a plurality of data detecting means responsive to signals from said latch means for detecting the presence of the data in said data detecting sections and producing a detection signal indicating the presence of data,
   data holding means disposed along said data transfer path at each of said plurality of data detecting sections for temporarily storing and holding a portion or all of the data existing in said data detecting sections, and
   coexistence detecting means responsive to the detection signals from said data detecting means for detecting coexistence of said data in a predetermined combination of data detecting sections, whereby upon detection of data in a predetermined combination of data detecting sections, the coexistence detecting means causes the apparatus to access data held in said data holding means in a predetermined data detecting section.

5. The data processing apparatus, as recited in claim 4, wherein said data detecting sections are defined between pairs of latch means along said data transfer path.

* * * * *